July 29, 1969 R. S. JOSEPH ET AL 3,457,892

PLURAL SCALE INDICATING MEANS

Filed Oct. 2, 1967

INVENTORS:
RAYMOND S. JOSEPH,
JULIUS KEMENY,
ANDREW HIGHLAND Jr.

BY *Francis H. Boos, Jr.*

THEIR ATTORNEY.

United States Patent Office 3,457,892
Patented July 29, 1969

3,457,892
PLURAL SCALE INDICATING MEANS
Raymond S. Joseph, Chesapeake, Julius Kemeny, Bennet's Harbor, and Andrew Highland, Jr., Chesapeake, Va., assignors to General Electric Company, a corporation of New York
Filed Oct. 2, 1967, Ser. No. 672,295
Int. Cl. H03j 1/04
U.S. Cl. 116—124.4                                           2 Claims

ABSTRACT OF THE DISCLOSURE

In a UHF-VHF television receiver, a slide rule indicating means comprises an outer substantially opaque cylinder including spirally arranged VHF indicia defined by translucent areas in the opaque cylinder and an axially extending substantially transparent segment including linearly arranged, substantially opaque VHF indicia. A translucent or transparent inner cylinder is mounted coaxially within the outer cylinder, which inner cylinder carries a spiral indicator line. Drive means are independently associated with the inner cylinder and the outer cylinder to indicate appropriate channels of both VHF and UHF reception.

Background of the invention

The invention relates to dial indicating means, and more specifically, it relates to a single dial providing indicating means for two variables.

Since all television receivers produced today require both VHF and UHF reception capabilities, indicating means must be capable of displaying both the VHF and UHF channels. While sundry forms of indicating means of this nature have been provided in the past, they frequently suffer from an over-complexity resulting in increased cost to the purchaser of a receiver in exchange for no return in the quality of reception. Yet, the choice of dials to perform this indicating function is limited to means which provide a clear indication of the particular channel tuned. This clear indication has been lacking in certain forms of the prior art which utilize a contracted UHF scale rendering an accurate reading quite difficult.

Summary of the invention

It is therefore an object of this invention to achieve a plural scale indicating means characteristic of a UHF-VHF tuner dial at a reduced cost.

It is a further object to achieve an indicating means which may be read with ease and accuracy.

In accordance with certain aspects of this invention, there is provided an outer cylinder with two sets of indicia. A first set is spirally arranged about a portion of the cylinder to provide a reading of a first variable while a second set is arranged axially along an axially extending segment of the cylinder to provide a reading for a second variable. An inner cylinder is placed in a coaxial position inside the outer cylinder to provide a precise reading on the second set of indicia which is achieved by the alignment of a spirally extending line on the inner cylinder with the axially extending indicia on the outer cylinder.

In accordance with certain more detailed aspects of this invention, the outer cylinder is substantially light impermeable excepting the spirally arranged indicia and the axially extending segment which are substantially light permeable. Lighting means are mounted along the cylinder axis to provide means for contrasting the light impermeable and light permeable areas by illumination.

Brief description of the drawings

The specification concludes with claims particularly pointing out and distinctly claiming the subject matter which I regard as my invention. The invention may also be understood from the following description taken in connection with the accompanying drawings in which:

Description of the preferred embodiment

Figure 1:
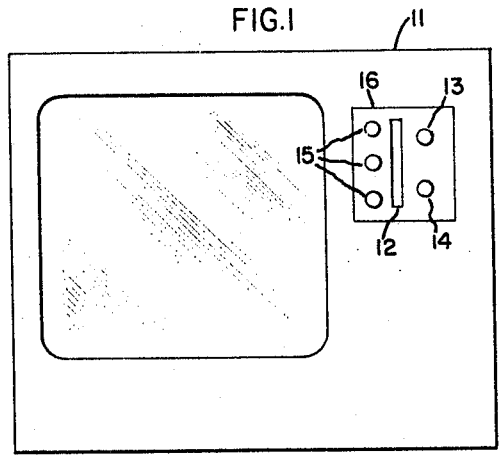
FIGURE 1 is a front view of a television receiver with a UHF-VHF capability and corresponding dual scale slide rule indicating means.

Referring first to FIGURE 1, there is disclosed a television receiver with UHF-VHF reception capabilities utilizing a plural scale indicating means, which means may be viewed through a channel defining slot 12 on the front 11 of the receiver cabinet. A knob 13 is provided to control the VHF channel selection which is presently set at "Channel 2" as seen in the slot 12. Similarly, a knob 14 is provided to achieve UHF channel selection when the knob 13 is in an appropriate position. Additional knobs 15 may be provided to effect additional control capabilities including contrast, volume, and focus. Slot 12 and the knobs 13, 14 and 15 all appear in a face plate 16 secured to the front 11 of the cabinet although the front 11 and face plate 16 may comprise an integrally molded unit.

Figure 2:
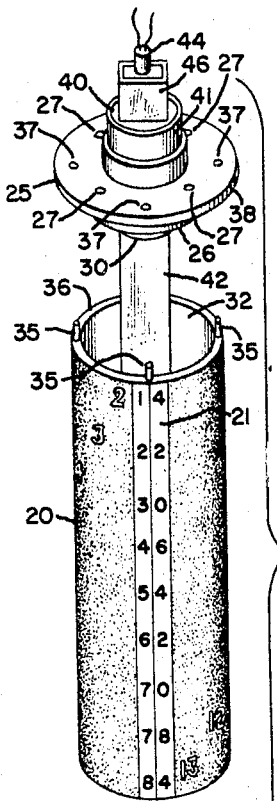
FIGURE 2 is a diassambled representation of the slide rule indication means of FIGURE 1.

In order to gain appreciation for the precise structure behind the slot 12, reference should be made to FIGURE 2 wherein certain aspects of the dual scale, slide rule indicating means are illustrated. As may be seen, a first or outer cylinder 20 carries a spiral set of indicia "2" through "13" to indicate the tuned VHF channel. The cylinder 20 also carries a linearly arranged set of indicia extending along an axially extending segment 21 to provide an indication of the tuned UHF channel. The linearly arranged set of indicia includes indicia 14 through 84 on a somewhat expanded scale thereby aiding in the readability and the accuracy of the scale. In order to further facilitate the reading of both the spirally arranged VHF set of indicia and the linearly arranged UHF set of indicia, the cylinder 20 is coated with a substantially light impermeable or opaque material excepting the VHF indicia and the axially extending segment 21 on which the UHF indicia are opaquely displayed.

Since the axially extending UHF indicia are incapable of indicating the particular channel to which it is desired to tune the receiver, a second or inner cylinder 23 is provided which is of a smaller diameter than the outer cylinder 20 to allow insertion within. A spiral indicating line 24 overlying the curved surface of the cylinder 23 will register behind the UHF set of indicia to indicate a particular channel when the inner cylinder 23 is inserted into position. The position of the cylinder 23 which corresponds to a tuned position of the UHF tuner will result in the spiral indicating line 24 registering with a corresponding UHF indicium.

Since the inner cylinder 23 is light permeable; i.e., translucent or transparent, light means may be provided within the coaxially arranged cylinders to more clearly indicate the precise channel selected. Although various alternatives are available to achieve the desired lighting effect, light piping is quite effective since it only requires a single light source in combination with a light pipe extending along the axis of the cylinders 21 and 23 to fully illuminate the dual scale, slide rule indicating means.

The apparatus for supporting the light pipe as well as the outer cylinder 20 and the inner cylinder 23 comprises first and second identical hub members 25. Each hub member 25 includes a shoulder portion 26 containing a plurality of apertures 27 which abut ends 28 of the inner cylinder 23. The lower end 28 also includes detents 29 which are received by the apertures 27 in the adjacent hub 25. To provide a more adequate bearing surface for the inner cylinder 23, a chamfered portion 30 is provided in each hub 25 which bears upon the inner cylindrical surface 31 at each end 28 of the inner cylinder 23.

Similarly, the shoulder 26 of each hub 25 bears upon the inner cylindrical surface 32 of the outer cylinder 20 to provide mounting means for the slide rule combination. Furthermore, detents 35 are provided at an upper end 36 of the outer cylinder 20 to engage one of the hubs 25 through apertures 37. In this manner, the outer cylinder 20 may be driven by rotation of the upper hub 25 without affecting the position of the inner cylinder 23 and the spiral indicating line 24 or the tuned position of the UHF tuner.

In order to provide means for driving both the outer cylinder 20 and the inner cylinder 23, the hubs 25 include gear portions 38 which are engaged individually by drive means associated with the UHF tuner and the VHF tuner. The hubs 25 also include split axle portions 41 with shoulders 47 which serve to support the slide rule indicating means when inserted into an appropriate frame member.

In order to provide appropriate illumination of the slide rule indicating means, a light pipe 42 is provided and inserted through openings 40 in the hubs 25. Since it may be desirable to maintain a predetermined relationship between a specifically shaped light pipe and the slot 12 for the sake of uniform lighting, there should be some clearance between the light pipe 42 and the openings 40 to allow independent relative movement. The precise shape of the light pipe 41 may vary as long as the above-mentioned predetermined relationship is maintained. Assuming a desirability in uniform lighting of the inner cylinder 23 and the outer cylinder 20 along the axes, the light pipe 42 may be tapered producing a maximum cross-section at a light source 44 and a minimum cross-section near the indicium 84. As shown, a face 46 of the light pipe 42 projects the light from the source 44 through the slot 12. As long as this face 46 opposes the slot 12 to achieve the above-mentioned predetermined relationship, uniform lighting of the slide rule combination may be achieved.

Figure 3:
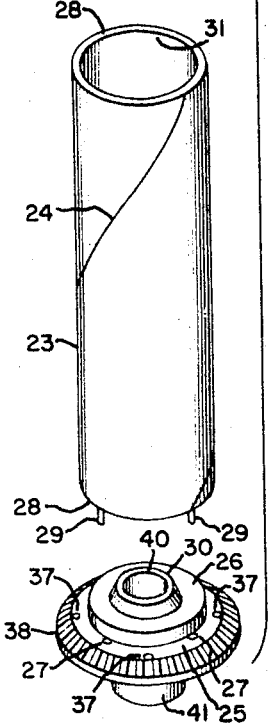
FIGURE 3 is an exposed view of the slide rule indicating means in combination with a UHF-VHF tuner means.
Figure 3:
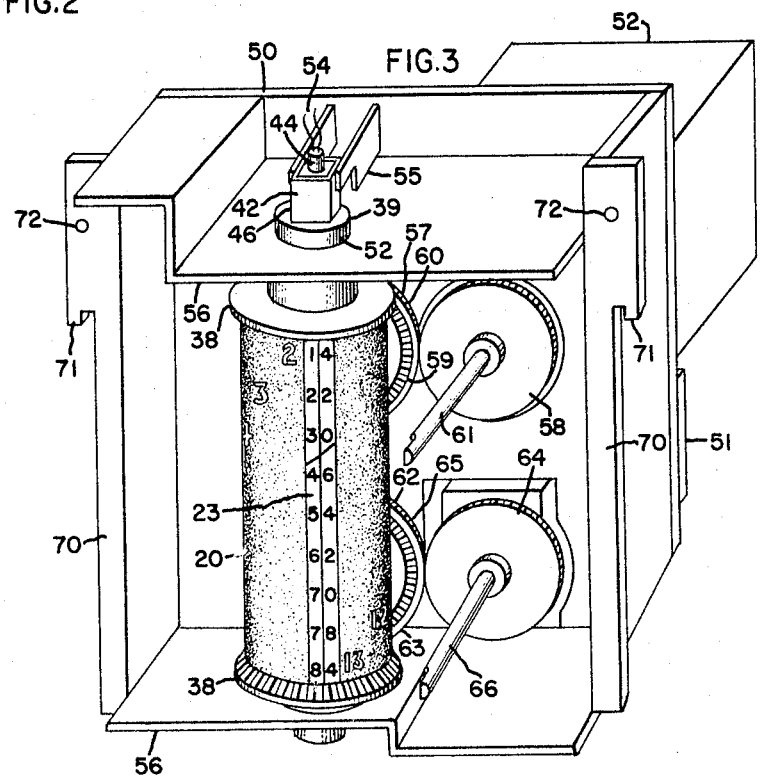

The completed assembly of the slide rule combination may be viewed in FIGURE 3 wherein mounting means comprising a frame member 50 supports the UHF tuner 51 and the VHF tuner 52. The frame member 50 includes opposing apertures 52 and 53 which receive the split axle portions 41. Projection members 54 retain the keyed light pipe 42 so as to maintain the face 46 opposite the slot 12 while allowing both the inner cylinder 23 and the outer cylinder 20 to move independently on the split axle portions 41. The position of slide rule indicating means between plates 56 of the frame member 50 is controlled by the shoulders 47 which serve to position the indicia behind the slot 12.

In addition to achieving a positioning function for the indicia, the shoulders 47 serve to position the gear 38 with respect to drive means associated with the UHF tuner 51 and the VHF tuner 52. The upper gear 38 engaging the outer cylinder 20 is driven by a gear train comprising a partially concealed idler gear 57 and an engaging spur gear 58. The idler gear 57 is essentially a unitary spur-face gear with the face portion engaging the gear 38 and a spur portion 60 engaging the spur gear 58. The entire gear train is driven by a tuner shaft 61 which is operatively connected to tuning elements of the VHF tuner 52 and extends through the face plate 16 of the television receiver to be terminated by the knob 13. In this way, the television viewer is able to select the desired VHF channel as depicted by the indicia 2 through 13 or select the UHF band represented by the axially extending segment carrying the indices 14 through 84.

In a similar manner, the UHF indicator comprising the indicator line 24 on the inner cylinder 23 is driven by the lower gear 38 which forms part of a gear train. The train comprises an idler gear 62 with a unitary spur-face structure which engages the lower gear 38 at a face portion 63 and which is driven by a UHF spur gear 64 along a spur portion 65. The UHF spur gear 64 is mounted on a UHF tuner shaft 66 which is operatively connected to the tuning elements of the UHF tuner 51 and extends through the face of plate 16 to be terminated by the UHF tuning knob 14. By adjusting the UHF tuning knob 14, a viewer may tune a desired UHF channel and view the selection of that channel with considerable clarity on the slide rule indicating means.

In order to facilitate the mounting of the frame member 50, tabs 70 may be provided along edges thereof, which tabs include ear portions 71 and apertures 72 adapted to receive fastening means to be secured to the television receiver cabinet.

It is appreciated that the slide rule combination might serve as an indicating means in a variety of dual measuring functions. Indeed, the slide rule combination might well be utilized in an application quite remote from that of the television receiver wherein an indicating means is desired which is low cost and/or easily read.

It is further appreciated that a variety of lighting means might be utilized to make the slide rule combination readable. In particular, the light pipe 42 need not be tapered but could include a light pipe of uniform cross-section with a series of quasi-logarithmically arranged hash marks more closely spaced behind the indicium 84 than at the indicium 14. However, a light piping arrangement need not be utilized where uniform lighting of the dial is not a specific requirement of the slide rule indicating means.

Although a specific embodiment of the invention has been described, it is not intended that the invention be limited to this particular embodiment. It is, however, intended by the appended claims to cover all modifications within the spirit and scope of the invention.

We claim:
1. A dual scale indicating means comprising:
 (a) a first cylinder having a circumferentially arranged set of indicia and a linearly arranged set of indicia thereon parallel to the axis of said first cylinder;
 (b) a second cylinder having a spiral line thereon said first cylinder and said second cylinder arranged coaxially, said spiral line indicating a position on said linearly arranged set of indicia wherein said circumferentially arranged set of indicia being spirally disposed on said first cylinder, said second cylinder being inserted within said first cylinder and being substantially light permeable, said spiral line being substantially light impermeable, said first cylinder being substantially light impermeable and includes a substantially light permeable axially extending segment surrounding said linearly arranged set of indicia;
 (c) a first gear coaxial with and engaging said first cylinder;
 (d) a second gear coaxial with and engaging said second cylinder said first gear and said first cylinder are held to each other by a first plurality of detents and a first plurality of apertures, said second gear and said second cylinder are held to each other by a second plurality of detents and a second plurality of apertures;
 (e) a lighting means coaxial with said first cylinder and said second cylinder, said lighting means providing illumination of the indicating means along the slot;

(f) a mounting means having two opposing apertures therein with said first gear and said second gear including axle portions extending through the apertures;
(g) a first drive means operatively engaging said first gear;
(h) a second drive means operatively engaging said second drive gear, said first drive means and said second drive means selectively and independently positioning said first cylinder and said second cylinder;
(i) a face plate with elongated slot parallel to the axis of said first cylinder.

2. A UHF–VHF tuner indicating means comprising:
(a) a first cylinder including a spirally arranged set of VHF indicia, a linearly arranged set of UHF indicia parallel to the axis of said first cylinder, and and axially extending segment surrounding said UHF indicia, said first cylinder being substantially light impermeable with said VHF indicia and said axially extending segment being substantially light permeable;
(b) a second substantially light permeable cylinder coaxial with and positioned internal to said first cylinder, said second cylinder including a substantially light impermeable spiral indicator line for indicating a selected UHF indicium.
(c) a face plate covering said first cylinder and having a slot extending along the axis thereof;
(d) lighting means coaxial with said first cylinder providing illumination at said slot;
(e) a first gear coaxial with and engaging said first cylinder and a second gear coaxial with and engaging said second cylinder;
(f) a mounting means having two opposing apertures therein with said first gear and said second gear including axle portions extending through the apertures;
(g) a VHF drive means operatively engaging said first gear, said VHF drive means including a VHF idler gear and a VHF drive gear for positioning said first cylinder, independently of said second cylinder;
(h) a UHF drive means operatively engaging said second gear, said UHF drive means including a UHF idler gear and a UHF drive gear for positioning said second cylinder independently of a said first cylinder; and
(i) a VHF tuning means including a tuner shaft carrying said VHF drive gear and a UHF tuning means including a tuner shaft carrying said UHF drive gear.

References Cited

UNITED STATES PATENTS

| | | | |
|---|---|---|---|
| 2,678,621 | 5/1954 | Proctor | 116—56 |
| 2,802,442 | 8/1957 | Helgeby | 116—57 |
| 3,149,607 | 9/1964 | Joseph et al. | 116—124.2 |
| 3,187,713 | 6/1965 | Fenwick | 116—124.3 |
| 3,227,128 | 1/1966 | Schmidt | 116—124.1 |

FOREIGN PATENTS

| | | |
|---|---|---|
| 465,442 | 5/1937 | Great Britain. |
| 477,096 | 12/1937 | Great Britain. |

LOUIS J. CAPOZI, Primary Examiner